(12) United States Patent
Kamiya et al.

(10) Patent No.: US 11,959,398 B2
(45) Date of Patent: Apr. 16, 2024

(54) COMPOSITE MATERIAL BLADE, ROTATING MACHINE, AND METHOD FOR MOLDING COMPOSITE MATERIAL BLADE

(71) Applicant: MITSUBISHI HEAVY INDUSTRIES, LTD., Tokyo (JP)

(72) Inventors: Masami Kamiya, Tokyo (JP); Ryoji Okabe, Tokyo (JP); Kentaro Shindo, Tokyo (JP); Takahiro Tachibana, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/911,281

(22) PCT Filed: Feb. 22, 2021

(86) PCT No.: PCT/JP2021/006602
§ 371 (c)(1),
(2) Date: Sep. 13, 2022

(87) PCT Pub. No.: WO2021/187016
PCT Pub. Date: Sep. 23, 2021

(65) Prior Publication Data
US 2023/0129429 A1    Apr. 27, 2023

(30) Foreign Application Priority Data

Mar. 17, 2020   (JP) ................................. 2020-046583

(51) Int. Cl.
*F01D 5/28*    (2006.01)
*B29D 99/00*   (2010.01)
*F01D 5/14*    (2006.01)

(52) U.S. Cl.
CPC ......... *F01D 5/282* (2013.01); *B29D 99/0025* (2013.01); *F01D 5/147* (2013.01); *F05D 2240/305* (2013.01); *F05D 2300/603* (2013.01)

(58) Field of Classification Search
CPC . F01D 5/282; F01D 5/147; F01D 5/14; F01D 5/28; B29D 99/0025;
(Continued)

(56) References Cited

U.S. PATENT DOCUMENTS

2016/0208615 A1    7/2016  Li et al.
2017/0226865 A1*   8/2017  Kray ....................... F01D 9/041
(Continued)

FOREIGN PATENT DOCUMENTS

JP    2016-138550 A    8/2016
JP    2017-187019 A    10/2017
(Continued)

OTHER PUBLICATIONS

English translation of International Search Report for International Application No. PCT/JP2021/006602, dated Apr. 20, 2021.
Written Opinion of the International Searching Authority for International Application No. PCT/JP2021/006602, dated Apr. 20, 2021, with a English translation.

*Primary Examiner* — Yi-Kai Wang
(74) *Attorney, Agent, or Firm* — BIRCH, STEWART, KOLASCH & BIRCH, LLP

(57) ABSTRACT

This composite material blade, which is formed using a composite material including reinforcing fibers and resin, and which has a positive pressure surface and a negative pressure surface, is provided with a ventral part, being the part on the positive pressure surface side in a blade thickness direction, which is the direction joining the positive pressure surface and the negative pressure surface, a dorsal part, being the part on the negative pressure surface side in the blade thickness direction, and a metal shield portion which is provided on the leading edge side, being the upstream side
(Continued)

in a flow direction in which a fluid flows, wherein: the metal shield portion includes a main body portion provided on the leading edge side, and an embedded portion which is provided on the trailing edge side, being the downstream side in the flow direction, of the main body portion, and which is provided between the ventral part and the dorsal part; and the plate thickness of the metal shield portion in the blade thickness direction decreases from the main body portion toward the embedded portion.

8 Claims, 7 Drawing Sheets

(58) Field of Classification Search
CPC ......... F05D 2240/305; F05D 2300/603; F05D 2240/121; F05D 2240/303; F05D 2300/612; B29C 70/16; B29C 70/345

USPC ........................................................ 415/183
See application file for complete search history.

(56) References Cited

U.S. PATENT DOCUMENTS

| | | | |
|---|---|---|---|
| 2018/0038385 A1* | 2/2018 | Welch | B22F 5/04 |
| 2018/0045216 A1* | 2/2018 | Karlen | F04D 29/023 |
| 2019/0010807 A1 | 1/2019 | Pouzadoux et al. | |
| 2019/0024512 A1 | 1/2019 | Guivarc'H et al. | |
| 2019/0249684 A1* | 8/2019 | Kuroki | B29D 24/005 |
| 2019/0360345 A1 | 11/2019 | De Gaillard et al. | |
| 2020/0386159 A1* | 12/2020 | Mizuno | F04D 29/023 |

FOREIGN PATENT DOCUMENTS

| | | |
|---|---|---|
| JP | 2018-538481 A | 12/2018 |
| JP | 2019-1024 A | 1/2019 |

* cited by examiner

COMPOSITE MATERIAL BLADE, ROTATING MACHINE, AND METHOD FOR MOLDING COMPOSITE MATERIAL BLADE

TECHNICAL FIELD

The present disclosure relates to a composite blade, a rotary machine, and a method for molding a composite blade.

BACKGROUND ART

Conventionally, as a composite blade, a product applied to a fan blade of a gas turbine engine of an aircraft is known (for example, refer to PTL 1). The fan blade has a composite airfoil part and a metal leading edge shield provided at the leading edge. The fan blade is provided with a metal leading edge shield to protect the fan blade from collisions such as bird strikes and dust.

CITATION LIST

Patent Literature

[PTL 1] Japanese Unexamined Patent Application Publication No. 2016-138550

SUMMARY OF INVENTION

Technical Problem

The application of the composite blade is also being investigated for industrial gas turbines. In an industrial gas turbine, an intake filter is installed at the upstream suction port of the compressor inlet, and thus it is not necessary to consider the entering of birds or dust during use as in an aircraft gas turbine engine. However, when the outside air temperature is low, there is a concern that the ice generated in the suction port or the front stage of the compressor collides with the blades in the rear stage. Therefore, in order to use the composite blade for the rotor blades of industrial gas turbines, it is necessary to improve the impact resistance.

Therefore, as in PTL 1, it is considered that, in the rotor blade of the compressor of the industrial gas turbine, the composite airfoil part is also covered with the metal leading edge shield so as to be sandwiched from the outer side. In this case, the rigidity of the composite blade from the leading edge to the trailing edge changes significantly between the part where the metal leading edge shield is provided and the part where the metal leading edge shield is not provided. When the rigidity of the composite blade changes significantly in the blade width direction connecting the leading edge and the trailing edge, there is a possibility that stress concentration occurs when stress is applied to the composite blade.

Therefore, the present disclosure provides a composite blade, a rotary machine, and a method for molding a composite blade that can suppress the occurrence of stress concentration by suppressing a change in rigidity from the leading edge side to the trailing edge side.

Solution to Problem

According to the present disclosure, there is provided a composite blade which is formed by using a composite material containing reinforcing fibers and a resin, and has a positive pressure surface and a negative pressure surface, the composite blade including: a pressure-side part which is a part on a positive pressure surface side in a blade thickness direction, which is a direction joining the positive pressure surface and the negative pressure surface; a suction-side part which is a part on a negative pressure surface side in the blade thickness direction; and a metal shield portion provided on a leading edge side which is an upstream side in a circulation direction in which a fluid circulates, in which the metal shield portion includes a main body portion provided on the leading edge side, and an embedded portion provided on a trailing edge side which is a downstream side of the main body portion in the circulation direction and provided between the pressure-side part and the suction-side part, and a plate thickness of the metal shield portion in the blade thickness direction decreases from the main body portion toward the embedded portion.

According to the present disclosure, there is provided a rotary machine, in which a plurality of the above-described composite blades are arranged along a circumferential direction.

According to the present disclosure, there is provided a method for molding a composite blade, which is for molding the above-described composite blade, in which the pressure-side part and the suction-side part are molded by laminating reinforcing fiber sheets, and the method includes: a step of laminating the reinforcing fiber sheets on a suction-side molding tool for molding the suction-side part to form the suction-side part; a step of laminating the reinforcing fiber sheets on a pressure-side molding tool for molding the pressure-side part to form the pressure-side part; a step of arranging the main body portion of the metal shield portion on the leading edge side, arranging the embedded portion between the pressure-side part and the suction-side part, and superimposing the suction-side part and the pressure-side part; and a step of joining the metal shield portion, the suction-side part, and the pressure-side part.

Advantageous Effects of Invention

According to the present disclosure, it is possible to suppress the occurrence of stress concentration by suppressing the change in rigidity from the leading edge side to the trailing edge side.

DESCRIPTION OF EMBODIMENTS

Hereinafter, embodiments according to the present disclosure will be described in detail with reference to the drawings. It should be noted that this embodiment does not limit this disclosure. In addition, the components in the following embodiments include those that can be easily replaced by those skilled in the art, or those that are substantially the same. Furthermore, the components described below can be appropriately combined, and when there are a plurality of embodiments, each embodiment can be combined.

Embodiment 1

A composite blade 10 according to Embodiment 1 is provided in a rotary machine 1 such as a gas turbine for power generation or a gas turbine engine, and can be applied to a rotor blade or a stator blade of the rotary machine 1. It will be described by applying this disclosure to a gas turbine as the rotary machine 1.

Figure 1:
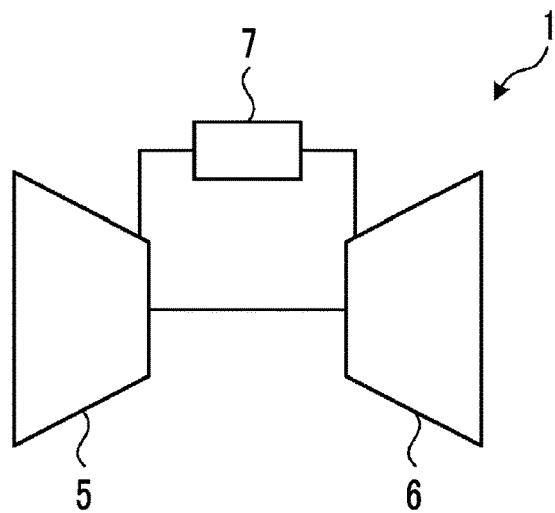
FIG. 1 is a schematic diagram of a rotary machine provided with a composite blade according to Embodiment 1.

FIG. 1 is a schematic diagram of the rotary machine provided with the composite blade according to Embodiment 1. As shown in FIG. 1, the rotary machine 1 includes a compressor 5, a turbine 6, and a combustor 7. In the compressor 5, a rotor blade stage composed of a plurality of rotor blades and a stator blade stage composed of a plurality of stator blades are alternately arranged. The rotor blade stage is provided with a plurality of rotor blades arranged side by side along the circumferential direction of the rotary shaft. The compressor 5 compresses the air taken in from the outside by rotating the rotary shaft and supplies the air to the combustor 7.

The combustor 7 produces combustion gas by mixing the compressed air compressed by the compressor 5 with the fuel and burning the fuel. In the turbine 6, a rotor blade stage composed of a plurality of stator blades and a stator blade stage composed of a plurality of stator blades are alternately arranged. The turbine 6 rotationally drives the rotary shaft by the combustion gas from the combustor 7.

(Composite Blade)

Figure 2:
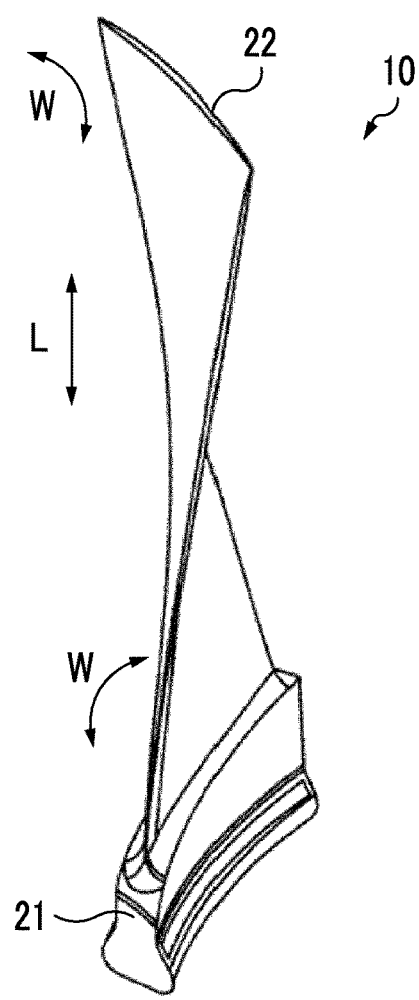
FIG. 2 is a perspective view schematically showing the composite blade according to Embodiment 1.
Figure 3:
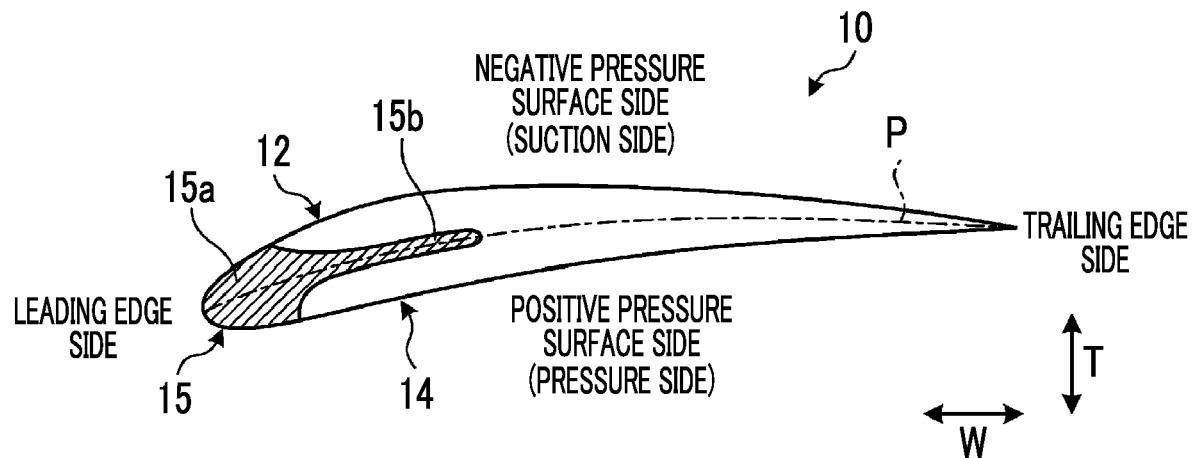
FIG. 3 is a cross-sectional view schematically showing the composite blade according to Embodiment 1.

Next, the composite blade 10 will be described with reference to FIGS. 2 and 3. FIG. 2 is a perspective view schematically showing the composite blade according to Embodiment 1. FIG. 3 is a cross-sectional view schematically showing the composite blade according to Embodiment 1. As shown in FIG. 2, the composite blade 10 is a rotor blade and extends from a blade root 21 side, which is a fixed end, to a blade top 22 side, which is a free end. Here, the direction connecting the blade root 21 side and the blade top 22 side is the blade spanwise direction, which is an L direction shown in FIG. 2. Further, in the composite blade 10, one side in the direction orthogonal to the blade spanwise direction in FIG. 2 is the leading edge side, and the other side is the trailing edge side. The direction connecting the leading edge side and the trailing edge side is the blade width direction, which is a W direction shown in FIG. 2. The leading edge side is the upstream side in the circulation direction of the fluid passing through the composite blade 10, and the trailing edge side is the downstream side.

The composite blade 10 is molded by using a composite material made of reinforcing fibers and a resin. Further, as shown in FIG. 3, the composite blade 10 is formed to be curved in the blade width direction, and the side projecting from the inside to the outer side of the composite blade 10 is the suction side, and the side recessed from the inside to the outer side of the composite blade 10 is the pressure side. Here, the direction connecting the suction side and the pressure side is the blade thickness direction, which is a T direction shown in FIG. 3. The blade surface on the suction side is a suction side which becomes a negative pressure surface when the fluid circulates through the composite blade 10, and the blade surface on the pressure side is a pressure side which becomes a positive pressure surface.

The composite blade 10 includes a suction-side blade member (suction-side part) 12 which is a suction-side part, a pressure-side blade member (pressure-side part) 14 which is a pressure-side part, and a metal shield portion 15 provided on the leading edge side of the suction-side blade member 12 and the pressure-side blade member 14.

The suction-side blade member 12 is formed by laminating and heat-curing a plurality of prepregs as reinforcing fiber sheets in which reinforcing fibers are impregnated with resin. The suction-side blade member 12 is molded by a suction-side molding tool 32 described later. The suction-side blade member 12 is formed in a curved shape in which the outer surface of the composite blade 10 is a projection. Further, the suction-side blade member 12 is formed in a curved shape in which the inner surface of the composite blade 10 is a recess.

Similar to the suction-side blade member 12, the pressure-side blade member 14 is formed by laminating and heat-curing a plurality of prepregs as reinforcing fiber sheets in which reinforcing fibers are impregnated with resin. The pressure-side blade member 14 is molded by a pressure-side molding tool 34 described later. The pressure-side blade member 14 is formed in a curved shape in which the outer surface of the composite blade 10 is a recess. Further, the pressure-side blade member 14 is formed in a curved shape in which the inner surface of the composite blade 10 is a projection.

Then, the trailing edge side of the suction-side blade member 12 in the blade width direction and the trailing edge side of the pressure-side blade member 14 in the blade width direction are joined on a neutral surface P which is a surface including the center of the composite blade 10 in the blade thickness direction. That is, the inner surface on the trailing edge side of the suction-side blade member 12 and the inner surface on the trailing edge side of the pressure-side blade member 14 are joined at the neutral surface P.

The metal shield portion 15 has a main body portion 15a provided on the leading edge side and an embedded portion 15b provided on the trailing edge side. The metal shield portion 15 is modeled by using metal, and is formed by, for example, a 3D printer using metal ink or the like.

The main body portion 15a is a part of the composite blade 10 exposed to the outside. The main body portion 15a has a solid structure made of metal. The main body portion 15a has a positive pressure side blade surface extending from the end portion on the leading edge side on the neutral surface P of the composite blade 10 to the trailing edge side via the positive pressure surface, and a negative pressure side blade surface extending from the end portion on the leading edge side on the neutral surface P of the composite blade 10 to the trailing edge side via the negative pressure surface.

The embedded portion 15b is provided on the trailing edge side of the main body portion 15a, and is a part to be embedded inside in the composite blade 10. The embedded portion 15b is provided between the suction-side blade member 12 and the pressure-side blade member 14, and is sandwiched between the suction-side blade member 12 and the pressure-side blade member 14. The plate thickness of the embedded portion 15b in the blade thickness direction decreases from the main body portion 15a side to the trailing edge side.

Further, the length of the metal shield portion 15 in the blade width direction is shorter than half of the total width of the composite blade 10.

Embodiment 2

Figure 4:
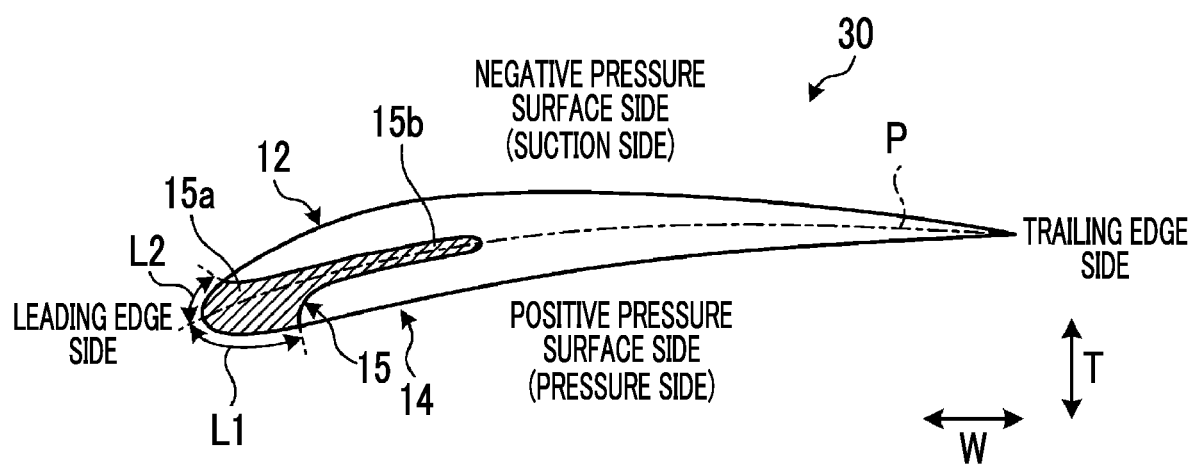
FIG. 4 is a cross-sectional view schematically showing a composite blade according to Embodiment 2.

Next, a composite blade 30 according to Embodiment 2 will be described with reference to FIG. 4. In addition, in Embodiment 2, in order to avoid duplicate description, the parts different from Embodiment 1 will be described, and the parts having the same configuration as Embodiment 1 will be described with the same reference numerals. FIG. 4 is a cross-sectional view schematically showing the composite blade according to Embodiment 2.

In the composite blade 30 of Embodiment 2, in a cross section cut along a plane orthogonal to the blade spanwise direction shown in FIG. 4, a length L1 from the end portion on the leading edge side to the trailing edge side on the negative pressure side blade surface of the main body portion 15a is formed longer than a length L2 from the end portion on the leading edge side to the trailing edge side on the positive pressure side blade surface of the main body portion 15a.

Embodiment 3

Figure 5:
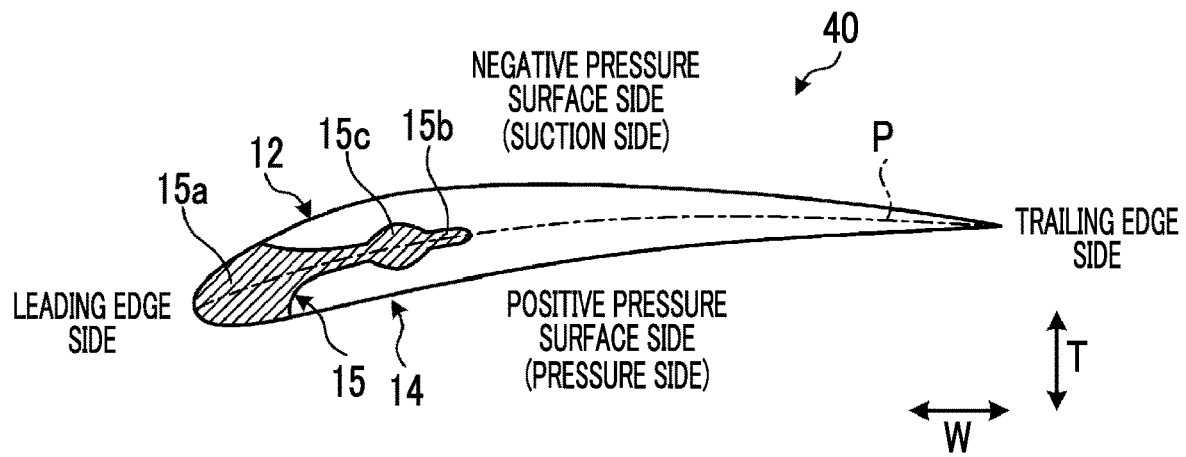
FIG. 5 is a cross-sectional view schematically showing a composite blade according to Embodiment 3.

Next, a composite blade 40 according to Embodiment 3 will be described with reference to FIG. 5. In addition, in Embodiment 3, in order to avoid duplicate description, the parts different from Embodiments 1 and 2 will be described, and the parts having the same configuration as Embodiments 1 and 2 will be described with the same reference numerals. FIG. 5 is a cross-sectional view schematically showing the composite blade according to Embodiment 3.

The composite blade 40 of Embodiment 3 further has a retaining unit 15c protruding from the embedded portion 15b in the blade thickness direction in a cross section cut along a plane orthogonal to the blade spanwise direction shown in FIG. 5. The retaining unit 15c protrudes on both sides in the blade thickness direction with respect to the embedded portion 15b, and has a shape in which the thickness in the blade thickness direction is partially increased. Therefore, the metal shield portion 15 has a shape of being sandwiched between the suction-side blade member 12 and the pressure-side blade member 14 when the suction-side blade member 12 and the pressure-side blade member 14 are joined.

Embodiment 4

Next, a composite blade 50 according to Embodiment 4 will be described with reference to FIG. 6. In addition, in Embodiment 4, in order to avoid duplicate description, the parts different from Embodiments 1 to 3 will be described, and the parts having the same configuration as Embodiments 1 to 3 will be described with the same reference numerals.

Figure 6:
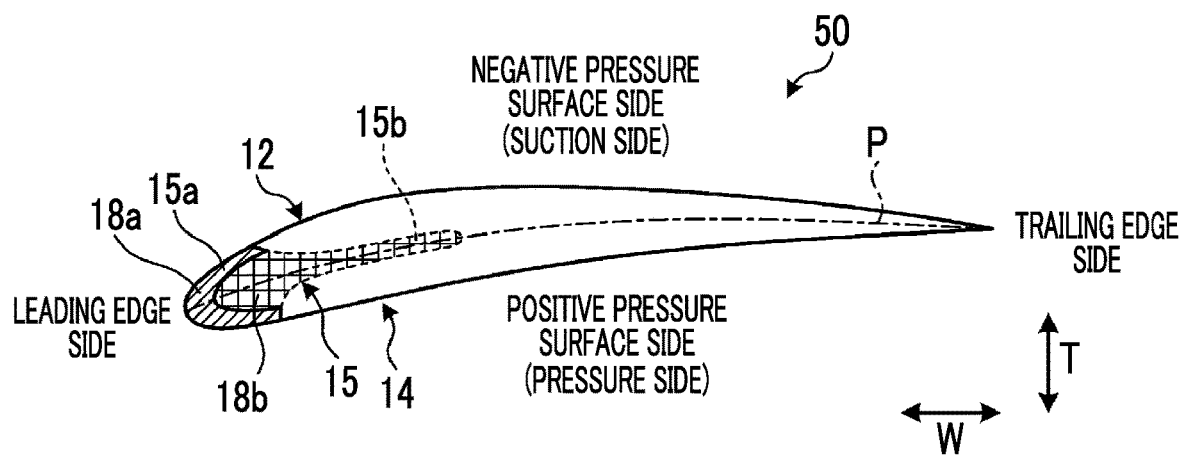
FIG. 6 is a cross-sectional view schematically showing a composite blade according to Embodiment 4.

FIG. 6 is a cross-sectional view schematically showing the composite blade according to Embodiment 4.

In the composite blade 50 of Embodiment 4, in the cross section cut along a plane orthogonal to the blade spanwise direction shown in FIG. 6, the main body portion 15a of the metal shield portion 15 has an outer surface part 18a which is the outer surface side, and an inner part 18b which is a part on the inner side of the outer surface part 18a. The outer surface part 18a has a solid structure made of metal. The inner part 18b and the embedded portion 15b have a lattice structure. The lattice structure is a structure in which a grid-like frame is periodically arranged.

Further, the inner part 18b may have a solid structure. That is, in the metal shield portion 15, as long as at least the outer surface part 18a has a solid structure and at least the embedded portion 15b has a lattice structure, other parts may have a solid structure or a lattice structure.

Embodiment 5

Figure 7:
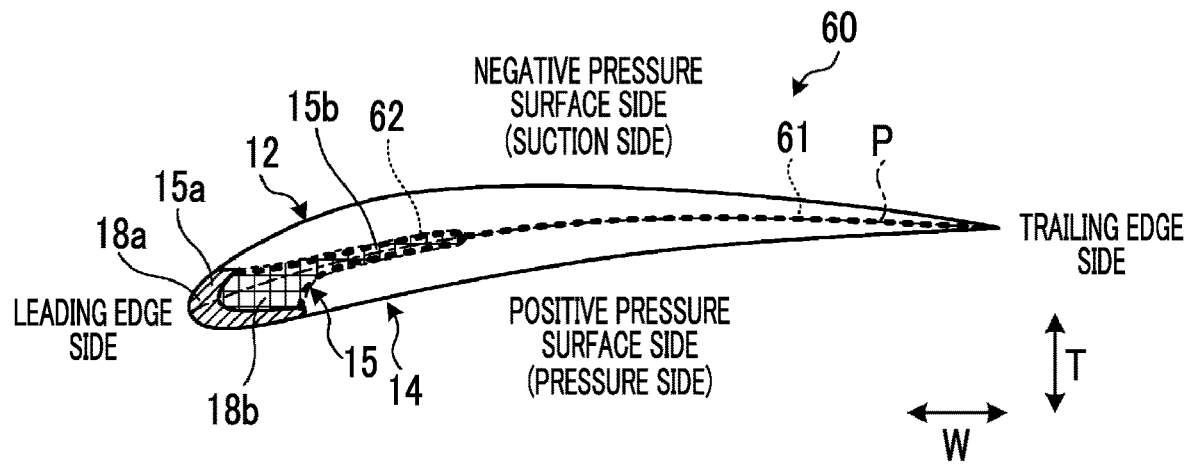
FIG. 7 is a cross-sectional view schematically showing a composite blade according to Embodiment 5.

Next, a composite blade 60 according to Embodiment 5 will be described with reference to FIG. 7. In addition, in Embodiment 5, in order to avoid duplicate description, the parts different from Embodiments 1 to 4 will be described, and the parts having the same configuration as Embodiments 1 to 4 will be described with the same reference numerals. FIG. 7 is a cross-sectional view schematically showing the composite blade according to Embodiment 5.

The composite blade 60 of Embodiment 5 has an adhesive layer 61 formed on a joint surface between the suction-side blade member 12 and the pressure-side blade member 14 in a cross section cut along a plane orthogonal to the blade spanwise direction shown in FIG. 7. The adhesive layer 61 is formed by sandwiching an adhesive sheet containing a thermosetting resin between the suction-side blade member 12 and the pressure-side blade member 14 at the time of joining and heating the adhesive sheet. Further, the composite blade 60 of Embodiment 5 is impregnated with a resin as an adhesive at the joint interface between the lattice structure and the suction-side blade member 12 of Embodiment 4 and the joint interface between the lattice structure and the pressure-side blade member 14. That is, the resin is impregnated into the lattice structure by sandwiching and heating the adhesive sheet between the lattice structure and the suction-side blade member 12 and between the lattice structure and the pressure-side blade member 14.

Embodiment 6

Figure 8:
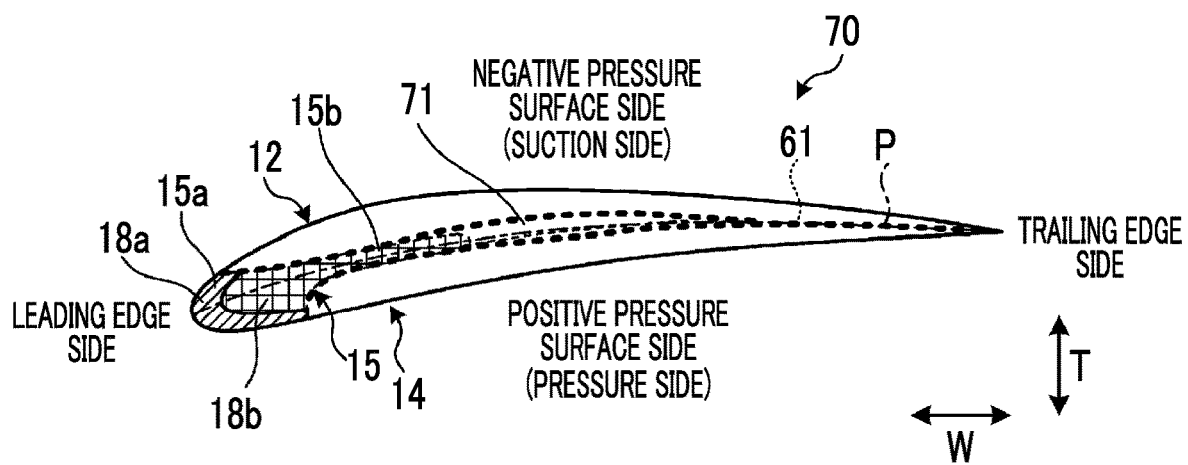
FIG. 8 is a cross-sectional view schematically showing a composite blade according to Embodiment 6.

Next, a composite blade 70 according to Embodiment 6 will be described with reference to FIG. 8. In addition, in Embodiment 6, in order to avoid duplicate description, the parts different from Embodiments 1 to 5 will be described, and the parts having the same configuration as Embodiments 1 to 5 will be described with the same reference numerals. FIG. 8 is a cross-sectional view schematically showing the composite blade according to Embodiment 6.

The composite blade 70 of Embodiment 6 further includes a foaming agent 71 filled inside the lattice structure of Embodiments 4 and 5 in a cross section cut along a plane orthogonal to the blade spanwise direction shown in FIG. 7. The foaming agent 71 is arranged between the suction-side blade member 12 and the pressure-side blade member 14 before foaming, and then heated and foamed to fill the inside of the lattice structure. The foaming agent 71 is composed of a resin component, a foaming component, and a fiber component. The resin component is cured by being heated, and may be the same as the resin contained in the reinforcing fiber sheet. The foaming component foams when heated. For example, when heated, the foaming component becomes carbon dioxide gas or the like, and bubbles are generated in the resin component. The fiber component is added such that the foaming due to the foaming component becomes a stable foaming form without unevenness.

(Lattice Structure)

Figure 9:
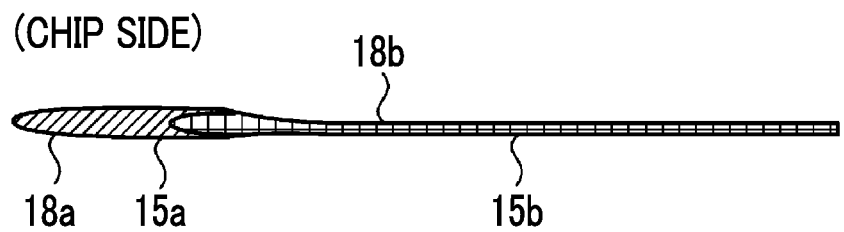
FIG. 9 is an explanatory view schematically showing an example of a metal shield portion of the composite blade.
Figure 9:
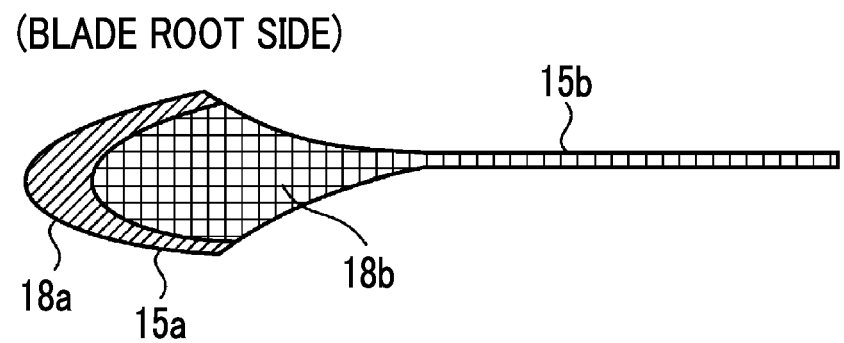
Figure 10:
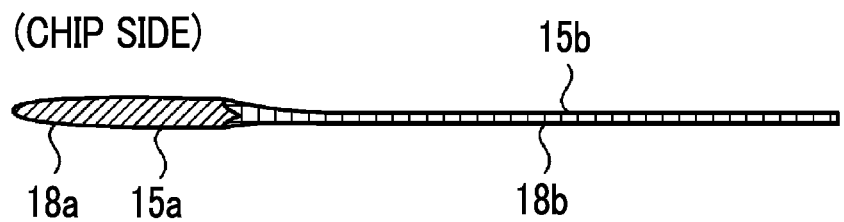
FIG. 10 is an explanatory view schematically showing an example of the metal shield portion of the composite blade.
Figure 10:
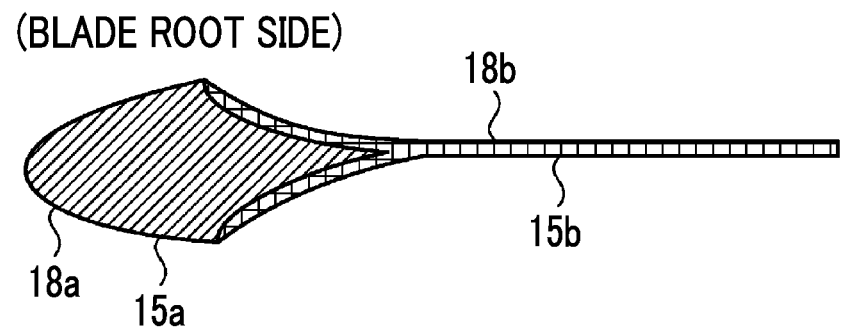
Figure 11:
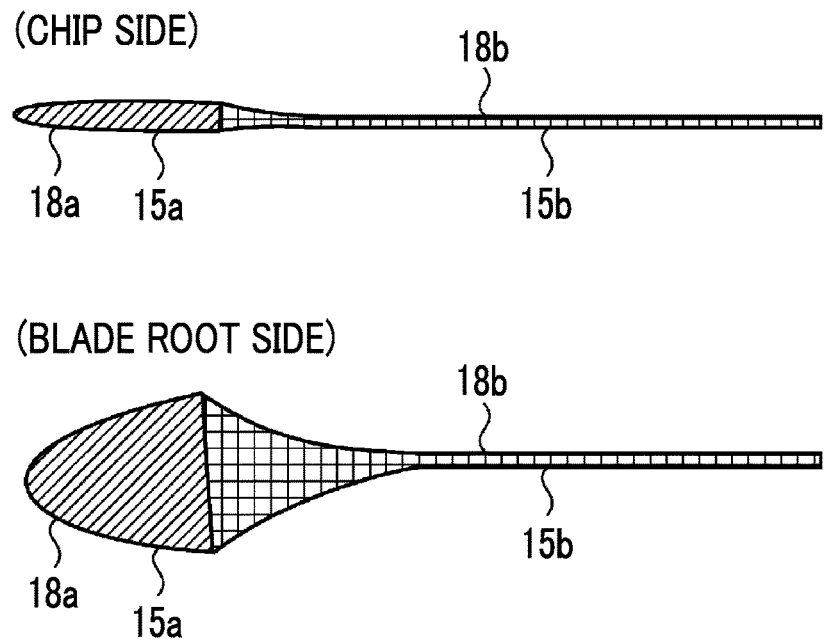
FIG. 11 is an explanatory view schematically showing an example of the metal shield portion of the composite blade.

Next, the metal shield portion 15 will be described with reference to FIGS. 9 to 11. FIGS. 9 to 11 are explanatory views schematically showing an example of the metal shield portion of the composite blade. In the metal shield portion 15, as shown in Embodiments 4 to 6, at least the outer surface part 18a has a solid structure, and at least the embedded portion 15b has a lattice structure.

In the metal shield portion 15 shown in FIG. 9, the inner part 18b has a lattice structure. As shown in FIG. 9, the thickness of the metal shield portion 15 in the blade thickness direction decreases on the blade top 22 side (chip side) of the composite blades 50, 60, and 70, and the thickness in the blade thickness direction increases on the blade root 21 side.

In the metal shield portion 15 shown in FIG. 10, the inner part 18b has a solid structure. Further, the part on the inner side on the leading edge side of the embedded portion 15b has a solid structure. As shown in FIG. 10, the thickness of the metal shield portion 15 in the blade thickness direction decreases on the blade top 22 side (chip side) of the composite blades 50, 60, and 70, and the thickness in the blade thickness direction increases on the blade root 21 side.

In the metal shield portion 15 shown in FIG. 11, the inner part 18b has a solid structure. Further, the embedded portion 15b has a lattice structure. As shown in FIG. 11, the thickness of the metal shield portion 15 in the blade thickness direction decreases on the blade top 22 side (chip side) of the composite blades 50, 60, and 70, and the thickness in the blade thickness direction increases on the blade root 21 side.

As shown in FIGS. 9 to 11, the metal shield portion 15 is not particularly limited in terms of the ratio between the solid structure and the lattice structure. The ratio between the solid structure and the lattice structure is appropriately set according to the performance required for the composite blade 10. When the composite blade 10 is applied as a rotor blade, the centrifugal force due to rotation acts. Therefore, for example, the metal shield portion 15 shown in FIG. 9 may be applied to reduce the weight. Further, when the composite blade 10 is applied as a stator blade, for example, the metal shield portion 15 shown in FIG. 10 may be applied in order to increase the rigidity. Further, the ratio between the solid structure and the lattice structure may be changed in the blade spanwise direction. For example, when the composite blade 10 is applied as a rotor blade, the ratio of the lattice structure may be larger than that of the solid structure toward the blade top (chip) side. Furthermore, in the lattice structure, the porosity of the lattice may be changed in a range of more than 0 and 50 or less.

Figure 12:
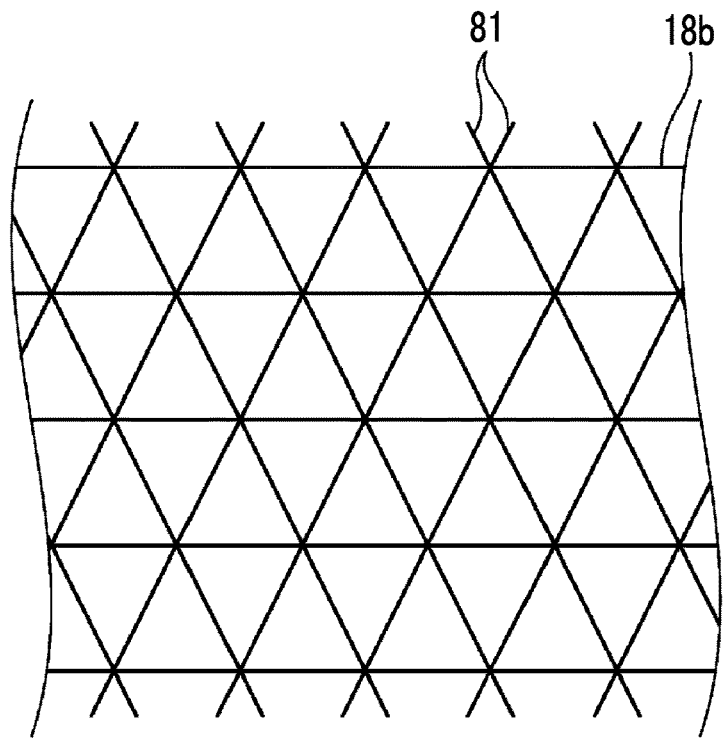
FIG. 12 is an explanatory view schematically showing a lattice structure of the composite blade.

Next, the lattice structure will be described with reference to FIG. 12. FIG. 12 is an explanatory view schematically showing a lattice structure of the composite blade. In the lattice structure, a protrusion portion 81 is provided at a part which is in contact with the suction-side blade member 12 and a part which is in contact with the pressure-side blade member 14. A plurality of protrusion portions 81 are provided on the outer surface of the lattice structure to form a pinholder shape. The protrusion portion 81 bites into the suction-side blade member 12 and the pressure-side blade member 14 to increase the joining strength between the metal shield portion 15 and the suction-side blade member 12 and the joining strength between the metal shield portion 15 and the pressure-side blade member 14.

(Method for Molding Composite Blade)

Next, the method for molding the composite blade 70 described above will be described with reference to FIG. 13. Further, in the following description, the case of molding the composite blade 70 of Embodiment 6 will be described. As for the method for molding the composite blade 70, a lay-up step S1, an installation step S2, an assembly step S3, and a curing step S4 are sequentially performed.

In the lay-up step S1, a suction-side lay-up step of forming a suction-side laminate 12a before molding the suction-side blade member 12 and a pressure-side lay-up step of forming a pressure-side laminate 14a before molding the pressure-side blade member 14.

In the suction-side lay-up step, the prepregs are laminated on a suction-side molding tool 26 for molding the suction-side blade member 12 to form the suction-side laminate 12a. The suction-side molding tool 26 has a molding surface for molding the outer surface of the suction-side blade member 12. The suction-side molding tool 26 is formed by being recessed in a recessed shape such that the outer surface of the suction-side blade member 12 is molded into a projected curved shape. In the suction-side lay-up step, vacuuming is performed every time several plies of prepregs are laminated to form the suction-side laminate 12a.

In the pressure-side lay-up step, the prepregs are laminated on a pressure-side molding tool 25 for molding the pressure-side blade member 14 to form the pressure-side laminate 14a. The pressure-side molding tool 25 has a molding surface for molding the outer surface of the pressure-side blade member 14. The pressure-side molding tool 25 is formed to protrude in a projected shape such that the outer surface of the pressure-side blade member 14 is molded into a recessed curved shape. In the pressure-side lay-up step, similar to the suction-side lay-up step, vacuuming is performed every time several plies of prepregs are laminated to form the pressure-side laminate 14a.

Figure 13:
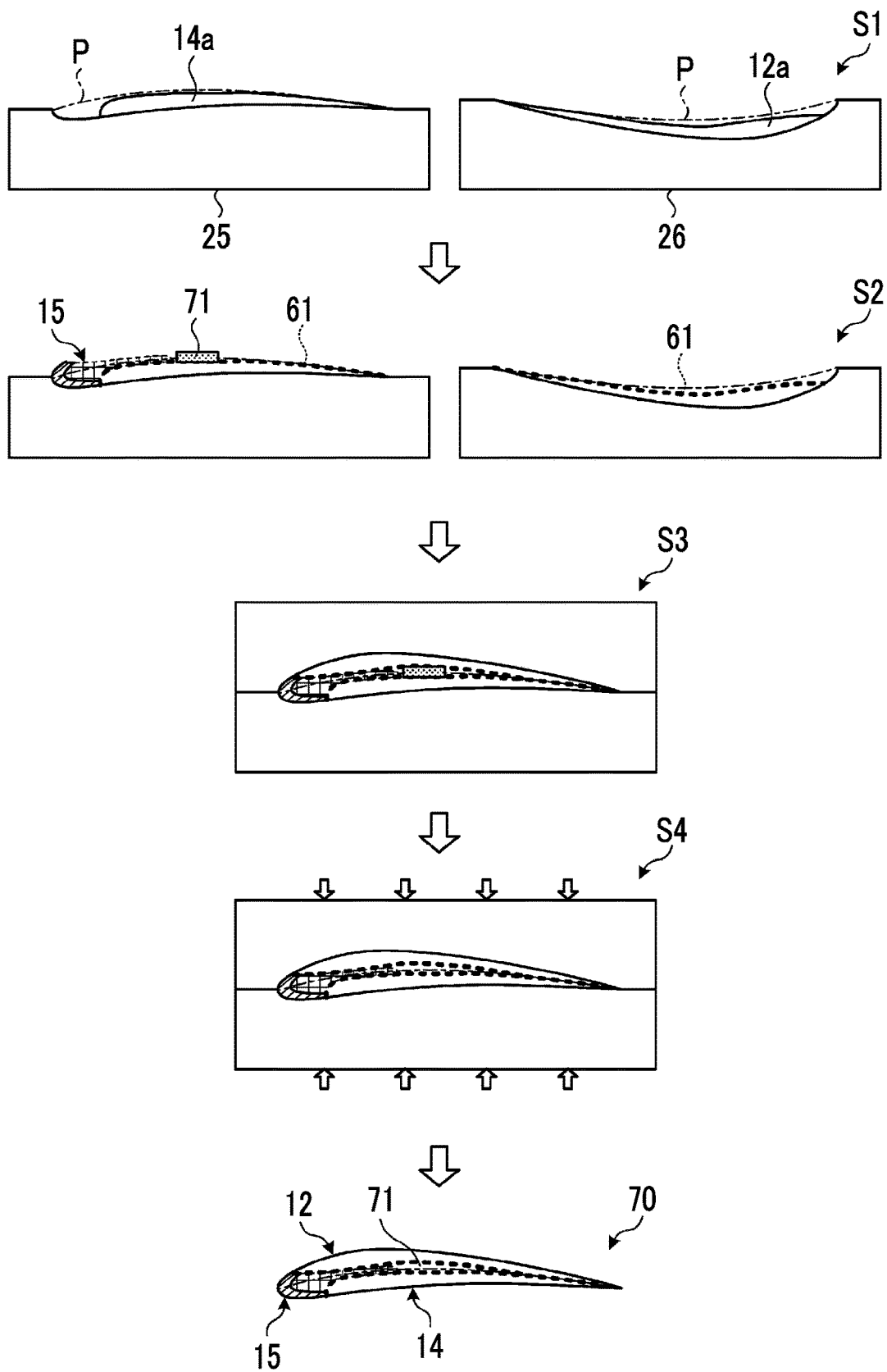
FIG. 13 is an explanatory view related to a method for molding a composite blade.

In the installation step S2, an adhesive sheet which is the adhesive layer 61 before curing is arranged inside the pressure-side laminate 14a (upper side in FIG. 13). Further, in the installation step S2, the metal shield portion 15 is arranged on the leading edge side of the pressure-side laminate 14a with the adhesive sheet sandwiched therebetween. Furthermore, in the installation step S2, the foaming agent 71 is arranged on the embedded portion 15b of the metal shield portion 15. Further, in the installation step S2, an adhesive sheet which is the adhesive layer 61 before curing is arranged inside the suction-side laminate 12a (upper side in FIG. 13).

In the assembly step S3, the suction-side molding tool 26 and the pressure-side molding tool 25 are assembled. Specifically, in the assembly step S3, the suction-side molding tool 26 and the pressure-side molding tool 25 are assembled such that the suction-side laminate 12a laminated on the suction-side molding tool 32 and the pressure-side laminate 14a laminated on the pressure-side molding tool 34 are superimposed on the neutral surface P. Further, in the assembly step S3, the pressure-side molding tool 25 is arranged on the lower side in the same state as the pressure-side lay-up step, and the suction-side molding tool 26 is turned upside down from the state of the suction-side lay-up step and arranged on the upper side of the pressure-side molding tool 25, and the suction-side molding tool 26 and the pressure-side molding tool 25 are assembled.

In the curing step S4, the suction-side laminate 12a, the pressure-side laminate 14a, the adhesive sheet, and the foaming agent 71 are heated while pressurizing in the direction in which the suction-side molding tool 26 and the pressure-side molding tool 25 approach each other. In the curing step S4, the foaming agent 71 expands by heating. Therefore, since the pressure inside the composite blade 70 is applied by the expansion of the foaming agent 71, the suction-side laminate 12a and the pressure-side laminate 14a before curing are pressurized toward the suction-side molding tool 32 and the pressure-side molding tool 34 by the foaming agent 71. Then, after the foaming agent 71 foams, the adhesive sheet (adhesive layer 61), the resin component of the foaming agent 71, and the resin of the prepreg are cured such that the suction-side laminate 12a, the pressure-side laminate 14a, and the metal shield portion 15 are heat-cured in a state of being pressurized by the foaming agent 71. As a result, the suction-side blade member 12 which is the suction-side laminate 12a after curing, the pressure-side blade member 14 which is the pressure-side laminate 14a after curing, the metal shield portion 15, and the foaming agent 71 are integrated, and the composite blade 70 is molded.

Then, by moving the suction-side molding tool 32 and the pressure-side molding tool 34 in the direction of being separated from each other, the molded composite blade 70 is released from the suction-side molding tool 32 and the pressure-side molding tool 34.

The molding method of the composite blade 70 is not particularly limited to the above-described molding method. After the suction-side laminate 12a is heat-cured to form the suction-side blade member 12, the pressure-side laminate 14a is heat-cured to be molded as the pressure-side blade member 14, and then the suction-side blade member 12, the pressure-side blade member 14 and the metal shield portion 15 may be joined via the adhesive layer 61.

Further, in the molding method of the composite blade 70, a case where a prepreg is applied as a reinforcing fiber sheet and the prepreg is heat-cured to be molded has been described, but the present disclosure is not particularly limited. For example, in the method for molding the composite blade 70, a dry reinforced fiber preform which is not impregnated with resin is applied as a reinforcing fiber sheet, and RTM molding in which resin impregnation is performed after lay-up, or press-molding in which thermoplastic resin impregnation is performed may be performed.

As described above, the composite blades 10, 30, 40, 50, 60, and 70, the rotary machine 1, and the method for molding the composite blades 10, 30, 40, 50, 60, and 70 according to the present embodiment is grasped as follows, for example.

According to a first aspect, there are provided composite blades 10, 30, 40, 50, 60, and 70 which are formed by using a composite material containing reinforcing fibers and a resin, and have a positive pressure surface and a negative pressure surface, including: a pressure-side part (pressure-side blade member 14) which is a part on a positive pressure surface side in a blade thickness direction, which is a direction joining the positive pressure surface and the negative pressure surface; a suction-side part (suction-side blade member 12) which is a part on a negative pressure surface side in the blade thickness direction; and the metal shield portion 15 provided on a leading edge side which is an upstream side in a circulation direction in which a fluid circulates, in which the metal shield portion 15 includes the main body portion 15a provided on the leading edge side, and the embedded portion 15b provided on a trailing edge side which is a downstream side of the main body portion 15a in the circulation direction and provided between the pressure-side part and the suction-side part, and a plate thickness of the metal shield portion 15 in the blade thickness direction decreases from the main body portion 15a toward the embedded portion 15b.

According to this configuration, the blade thickness of the metal shield portion 15 can be gradually decreased from the leading edge side toward the trailing edge side in the blade width direction, and thus a steep change in rigidity in the blade width direction can be suppressed. Therefore, it is possible to suppress the occurrence of stress concentration by suppressing the change in the rigidity of the composite blades 10, 30, 40, 50, 60, and 70 from the leading edge side to the trailing edge side.

According to a second aspect, in the main body portion 15a, the length L1 from an end portion on the leading edge side to the trailing edge side through the positive pressure surface is longer than the length L2 from the end portion on the leading edge side to the trailing edge side through the negative pressure surface.

According to this configuration, since the length L1 on the positive pressure side can be lengthened, the covering area of the metal shield portion 15 on the positive pressure surface side can be made larger than that on the negative pressure surface side. Therefore, the protection of the composite blades 10, 30, 40, 50, 60, and 70 on the positive pressure surface side can be further strengthened.

According to a third aspect, the metal shield portion 15 further includes the retaining unit 15c provided in the embedded portion 15b and protruding from the embedded portion 15b in the blade thickness direction.

According to this configuration, when the composite blades 10, 30, 40, 50, 60, and 70 are rotor blades, the deviation of the metal shield portion 15 due to the centrifugal force acting on the composite blades 10, 30, 40, 50, 60, and 70 can be restricted by the retaining unit 15c.

According to a fourth aspect, the main body portion 15a has the outer surface part 18a which is an outer surface side and the inner part 18b which is a part on an inner side of the outer surface part 18a, and in the metal shield portion 15, at least the outer surface part 18a has a solid structure and at least the embedded portion 15b has a lattice structure.

According to this configuration, the weight of the composite blades 10, 30, 40, 50, 60, and 70 can be reduced by adopting the lattice structure. Therefore, when the composite blades 10, 30, 40, 50, 60, and 70 are applied to the rotor blades, the increase in the centrifugal load can be suppressed. Further, by adopting the lattice structure, it is possible to further suppress a steep change in rigidity in the blade width direction.

According to a fifth aspect, the lattice structure is impregnated with the resin at a joint interface with the pressure-side part and the joint interface with the suction-side part.

According to this configuration, since the joint interface can be impregnated with the resin as an adhesive, the joining strength between the lattice structure and the pressure-side part and the joining strength between the lattice structure and the suction-side part can be improved.

According to a sixth aspect, the foaming agent 71 that fills an inside of the lattice structure is further provided.

According to this configuration, by filling the lattice structure with the foaming agent 71, it is possible to suppress the generation of voids around the metal shield portion 15 due to the pressurizing force applied by the expansion of the foaming agent 71. Further, since the pressure-side part, the suction-side part, and the metal shield portion 15 can be pressed against the molding tool by the pressurizing force, the molding accuracy can be improved.

According to a seventh aspect, the lattice structure is provided with the protrusion portions 81 at a part which is in contact with the pressure-side part and a part which is in contact with the suction-side part.

According to this configuration, the joining strength between the lattice structure and the pressure-side part and the joining strength between the lattice structure and the suction-side part can be improved.

According to an eighth aspect, there is provided the rotary machine 1, in which the plurality of the above-described composite blades 10, 30, 40, 50, 60, and 70 are arranged along a circumferential direction.

According to this configuration, it is possible to provide the rotary machine 1 using a highly durable composite blades 10, 30, 40, 50, 60, and 70 that suppress stress concentration.

According to a ninth aspect, there is provided a method for molding the composite blades 10, 30, 40, 50, 60, and 70, which is for molding the composite blades 10, 30, 40, 50, 60, and 70, in which the pressure-side part and the suction-side part are molded by laminating reinforcing fiber sheets, and the method includes: a step S1 of laminating the reinforcing fiber sheets on the suction-side molding tool 26 for molding the suction-side part to form the suction-side part; a step S1 of laminating the reinforcing fiber sheets on the pressure-side molding tool 25 for molding the pressure-side part to form the pressure-side part; a step S3 of arranging the main body portion 15*a* of the metal shield portion 15 on the leading edge side, arranging the embedded portion 15*b* between the pressure-side part and the suction-side part, and superimposing the suction-side part and the pressure-side part; and a step S4 of joining the metal shield portion 15, the suction-side part, and the pressure-side part.

According to this configuration, it is possible to mold the composite blades 10, 30, 40, 50, 60, and 70 in which the blade thickness of the metal shield portion 15 is gradually reduced from the leading edge side toward the trailing edge side in the blade width direction. Therefore, it is possible to mold the composite blades 10, 30, 40, 50, 60, and 70 in which the occurrence of stress concentration is suppressed.

REFERENCE SIGNS LIST

1 Rotary machine
5 Compressor
6 Turbine
7 Combustor
10, 30, 40, 50, 60, 70 Composite blade
12 Suction-side blade member
14 Pressure-side blade member
15 Metal shield portion
15*a* Main body portion
15*b* Embedded portion
15*c* Retaining unit
18*a* Outer surface part
18*b* Inner part
25 Pressure-side molding tool
26 Suction-side molding tool
61 Adhesive layer
71 Foaming agent
81 Protrusion portion

The invention claimed is:

1. A composite blade which is formed by using a composite material containing reinforcing fibers and a resin, and has a positive pressure surface and a negative pressure surface, the composite blade comprising:
   a pressure-side part which is a part on a positive pressure surface side in a blade thickness direction, which is a direction joining the positive pressure surface and the negative pressure surface;
   a suction-side part which is a part on a negative pressure surface side in the blade thickness direction; and
   a metal shield portion provided on a leading edge side which is an upstream side in a circulation direction in which a fluid circulates, wherein
   the metal shield portion includes a main body portion provided on the leading edge side, and an embedded portion provided on a trailing edge side which is a downstream side of the main body portion in the circulation direction and provided between the pressure-side part and the suction-side part, and
   a plate thickness of the metal shield portion in the blade thickness direction decreases from the main body portion toward the embedded portion, wherein
   the main body portion has an outer surface part which is an outer surface side and an inner part which is a part on an inner side of the outer surface part, and
   in the metal shield portion, at least the outer surface part has a solid structure and at least the embedded portion has a lattice structure.

2. The composite blade according to claim 1, wherein in the main body portion, a length from an end portion on the leading edge side to the trailing edge side through the positive pressure surface is longer than a length from the end portion on the leading edge side to the trailing edge side through the negative pressure surface.

3. The composite blade according to claim 1, wherein the metal shield portion further includes a retaining unit provided in the embedded portion and protruding from the embedded portion in the blade thickness direction.

4. The composite blade according to claim 1, wherein the lattice structure is impregnated with the resin at a joint interface with the pressure-side part and the joint interface with the suction-side part.

5. The composite blade according to claim 1, further comprising:
   a foaming agent that fills an inside of the lattice structure.

6. The composite blade according to claim 1, wherein the lattice structure is provided with protrusion portions at a part which is in contact with the pressure-side part and a part which is in contact with the suction-side part.

7. A rotary machine wherein
   a plurality of composite blades according to claim 1 are arranged along a circumferential direction.

8. A method for molding a composite blade, which is for molding the composite blade according to claim 1, wherein the pressure-side part and the suction-side part are molded by laminating reinforcing fiber sheets, and the method comprises:
   a step of laminating the reinforcing fiber sheets on a suction-side molding tool for molding the suction-side part to form the suction-side part;
   a step of laminating the reinforcing fiber sheets on a pressure-side molding tool for molding the pressure-side part to form the pressure-side part;
   a step of arranging the main body portion of the metal shield portion on the leading edge side, arranging the embedded portion between the pressure-side part and the suction-side part, and superimposing the suction-side part and the pressure-side part; and a step of joining the metal shield portion, the suction-side part, and the pressure-side part.

\* \* \* \* \*